(No Model.)
J. DAVIS.
FILTER.
No. 577,238. Patented Feb. 16, 1897.
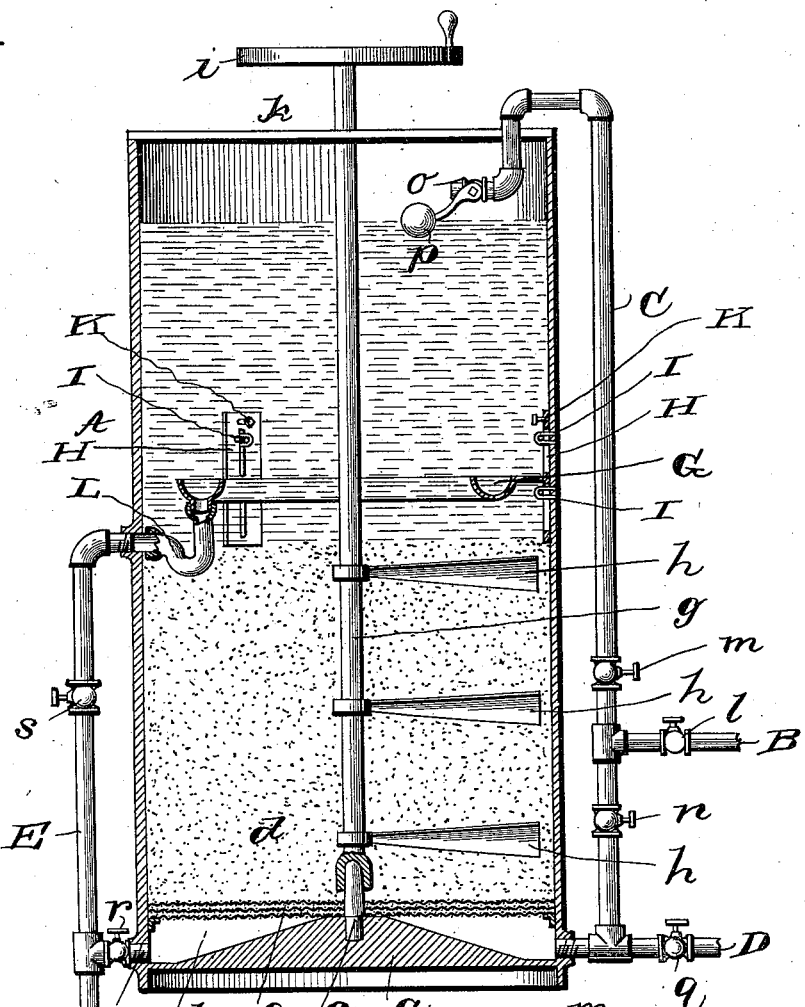
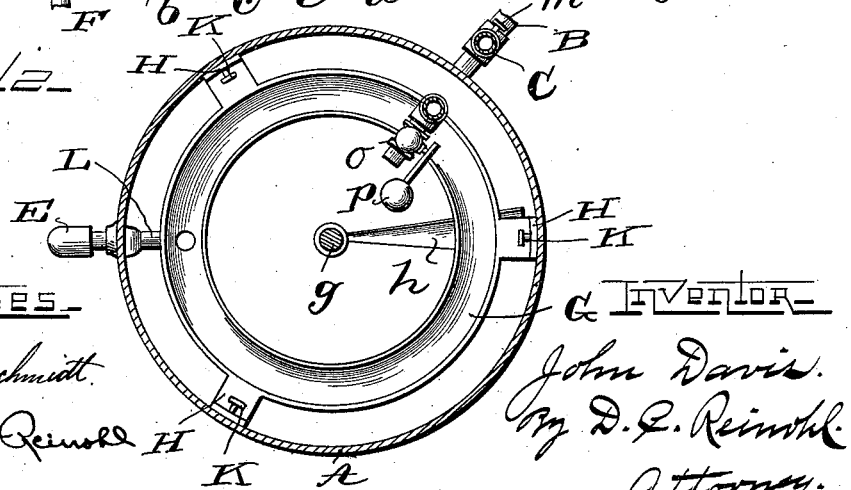
Witnesses
G. A. Tauberschmidt
D. Reimer Reinohl
Inventor
John Davis
By D. L. Reinohl
Attorney

UNITED STATES PATENT OFFICE.

JOHN DAVIS, OF ALLEGHENY, PENNSYLVANIA.

FILTER.

SPECIFICATION forming part of Letters Patent No. 577,238, dated February 16, 1897.

Application filed March 25, 1896. Serial No. 584,765. (No model.)

*To all whom it may concern:*

Be it known that I, JOHN DAVIS, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My present invention relates to filters, and has especial reference to that class of filters known to the trade as "gravity-filters," and has for its object certain improvements in construction, which will be fully disclosed in the following specification and claims.

In the accompanying drawings, which form part of this specification, Figure 1 represents a vertical section of a filter provided with my improvements, and Fig. 2 a top plan view of the same.

Reference being had to the drawings and the letters thereon, A indicates the body of a filter, which is provided with a bottom $a$, inclined upward toward the center to form a capacious filtered-water chamber $b$, which can be drained of water when cleansing the filter-bed, and also forms a support at the center of the filter for the foraminous bottom $c$, upon which the filter-bed $d$ rests. In the center of the bottom $a$ is a gudgeon $e$, upon which the end of the shaft $g$ of the agitator rests and revolves in raising and cleansing the filter-bed. The shaft $g$ is provided with blades $h$, set at an angle to a horizontal plane, for raising and agitating the filter-bed, and with a suitable crank $i$, secured to the upper end of the shaft, and the shaft is supported in a transverse bar $k$ at the upper end of the filter.

B is the main water-supply pipe, which is provided with a valve $l$ and connects with a vertical pipe C, which is provided with valves $m$ and $n$, one above and the other below the point of juncture of the two pipes, and control the direction of the water to the filter for the purpose of filtering the water or cleansing the filter. The upper end of the pipe C enters the filter and is provided with a valve or stop-cock $o$, automatically operated by a float $p$, actuated by the rise and fall of the water in the filter, and the lower end of said pipe connects with the clear-water-discharge pipe D, which is provided with a valve $q$.

The pipe F is provided with a valve $r$.

E is the waste-water pipe, with which connects the pipe F, communicating with the filtered-water chamber $b$, and is provided with a valve $s$, and the upper end of the pipe E communicates with the filter-chamber above the granular bed $d$.

The filter as thus far constructed may be of any desired and approved form of gravity-filter with an open upper end and forms no part of my present invention. In this class of filters the granular filter-bed is raised for cleansing purposes by the upward pressure of the water used, assisted by the agitator, and as a consequence the loose particles of the filter-bed are raised to different heights in the filter, according to the upward pressure of the water. To provide against these loose particles of the bed being carried out with the dirty water in cleansing the bed and also to provide for a thorough removal of all the impurities that may be in or on the surface water, I provide an annular trough G, supported upon vertically-adjustable brackets H, attached to the trough, guided in suitable loops or staple-like ways I, secured to the inside of the wall or body of the filter, and the brackets secured in any position required and within the range of their adjustment by screws K, and the water collected from the surface of the water in the filter is conducted to the waste-pipe E, and to provide for the vertical adjustment of the trough G a section L of flexible pipe, such as rubber or other like suitable material, is interposed between the waste-pipe and the trough.

By the vertical adjustment of the trough the granular filter-bed may always be maintained at the maximum depth and the loose floating material arrested by the bed and the dirty water collected in the trough and conducted to the waste-pipe of the filter without wasting the filter-bed by carrying its loose particles off with the dirty water obtained from the bed.

The height to which the sand of the bed is raised by the pressure of the water having been ascertained, the trough is adjusted above said point and secured by the screws.

Having thus fully described my invention, what I claim is—

1. A filter provided with a granular filter-bed, in combination with an annular receptacle vertically adjustable on the wall or body of the filter and means for conducting waste water out of the filter.

2. A filter provided with a granular filter-bed, in combination with a vertically-adjustable and annular receptacle for collecting waste water from the surface and a flexible connection between said receptacle and the waste-pipe of the filter.

3. A filter provided with a granular filter-bed, in combination with a vertically-adjustable annular receptacle for collecting waste water from the surface, brackets for supporting the receptacle, means on the inner surface of the filter for supporting the brackets and means for securing the brackets.

In testimony whereof I affix my signature in presence of two witnesses.

JOHN DAVIS.

Witnesses:
 EDW. A. HESS,
 J. W. LACKEY.